US012388177B2

(12) United States Patent
Komancsik et al.

(10) Patent No.: US 12,388,177 B2
(45) Date of Patent: Aug. 12, 2025

(54) DUAL RESONANT WIDEBAND MEANDERED PCB ANTENNA

(71) Applicant: Silicon Laboratories Inc., Austin, TX (US)

(72) Inventors: Marton Komancsik, Budapest (HU); Zoltan Vida, Budapest (HU); Attila Zolomy, Budapest (HU)

(73) Assignee: Silicon Laboratories Inc., Austin, TX (US)

( * ) Notice: Subject to any disclaimer, the term of this patent is extended or adjusted under 35 U.S.C. 154(b) by 169 days.

(21) Appl. No.: 18/079,124

(22) Filed: Dec. 12, 2022

(65) Prior Publication Data

US 2024/0195063 A1 Jun. 13, 2024

(51) Int. Cl.
*H01Q 5/10* (2015.01)
*H01Q 1/38* (2006.01)
*H01Q 1/50* (2006.01)

(52) U.S. Cl.
CPC ................. *H01Q 5/10* (2015.01); *H01Q 1/38* (2013.01); *H01Q 1/50* (2013.01)

(58) Field of Classification Search
CPC ............... H01Q 1/38; H01Q 1/50; H01Q 5/10
See application file for complete search history.

(56) References Cited

U.S. PATENT DOCUMENTS 6,442,400 B1 * 8/2002 Ying ...................... H01Q 1/243 455/552.1
8,847,847 B2 * 9/2014 Tu ........................... H01Q 1/38 343/895
9,007,275 B2 * 4/2015 Pros ....................... H01Q 21/29 343/702
2003/0210188 A1 * 11/2003 Hebron .................... H01Q 9/30 343/702
2008/0191945 A1 * 8/2008 Taki ......................... H01Q 1/38 343/700 MS
2009/0066600 A1 * 3/2009 Rabinovich .............. H01Q 9/26 343/793
2009/0318094 A1 * 12/2009 Pros .................. H01Q 21/0006 455/75
2010/0328165 A1 * 12/2010 Hsu .......................... H01Q 9/26 343/702

(Continued)

FOREIGN PATENT DOCUMENTS

JP 2014220674 A * 11/2014 ............... H01Q 9/26

OTHER PUBLICATIONS

Machine Translation of JP2014220674A (Year: 2014).*

(Continued)

*Primary Examiner* — Raymond R Chai
(74) *Attorney, Agent, or Firm* — Nields, Lemack & Frame, LLC

(57) ABSTRACT

A dual resonant wideband meandered PCB antenna is disclosed. The antenna includes two meandered paths that are joined at a common feeding path. The meandered paths have different lengths, which results in different resonance frequencies. The antenna may also include a short circuit stub connected to the feeding path for impedance matching. In some embodiments, the antenna is formed on one layer of a printed circuit board. In another embodiment, to conserve space, the antenna may be formed on multiple layers of the printed circuit board.

14 Claims, 10 Drawing Sheets

(56) References Cited

U.S. PATENT DOCUMENTS

| | | | | |
|---|---|---|---|---|
| 2011/0025576 | A1* | 2/2011 | Mao | H01Q 1/38<br>343/843 |
| 2014/0049445 | A1* | 2/2014 | Tu | H01Q 9/26<br>343/893 |
| 2019/0393603 | A1* | 12/2019 | Rutfors | H01Q 1/48 |
| 2020/0161764 | A1* | 5/2020 | Liao | H01Q 1/521 |
| 2022/0029299 | A1* | 1/2022 | Ling | H01Q 9/42 |

OTHER PUBLICATIONS

Mallahzadeh et al., A Tunable Multi-band Meander Line Printed Monopole Antenna for MIMO Systems. Proceedings of the 5th European Conference on Antennas and Propagation (EUCAP). Jul. 2013.

Memarzadeh-Tehran et al., A Dual-Band Meander Monopole Antenna for On-Body Devices. IEEE International Symposium on Antennas and Propagation (APSURSI). 2011.

* cited by examiner

DUAL RESONANT WIDEBAND MEANDERED PCB ANTENNA

This disclosure describes an antenna system, and more particularly a dual resonant wideband meandered antenna.

BACKGROUND

The explosion of network connected devices has led to an increased use of certain wireless protocols. For example, simple wireless network devices are being implemented as temperature sensors, humidity sensors, pressure sensors, motion sensors, cameras, light sensors, dimmers, light sources, and other functions. Additionally, these wireless network devices have become smaller and smaller.

These wireless network devices are typically equipped with an embedded antenna. Certain network protocols utilize a large frequency range, such as more than 60 MHZ. Further, due to different RF regulatory standards globally, sub-GHz wireless products, such as IoT devices, may need to work at one frequency range in the United States, and a different frequency range in Europe. Designing an antenna that has acceptable performance across this wide range of frequencies may be difficult.

Further, in these network connected devices, space is typically very limited. Therefore, there is not much space within the device to house an antenna.

Therefore, it would be advantageous if there were an antenna design that may be operated over a wide range of frequencies that was very compact.

SUMMARY

A dual resonant wideband meandered PCB antenna is disclosed.) The antenna includes two meandered paths that are joined to a common feeding path. The meandered paths have different lengths, which results in different resonance frequencies. The antenna may also include a short circuit stub connected to the feeding path for impedance matching. In some embodiments, the antenna is formed on one layer of a printed circuit board. In another embodiment, to conserve space, the antenna may be formed on multiple layers of the printed circuit board. The resonance frequencies are selected to create a wideband antenna.

According to one embodiment, a wideband antenna is disclosed. The wideband antenna comprises a printed circuit board, comprising: a feeding path; a first radiator, formed as a first meandered trace having a first resonance frequency, wherein the first meandered trace comprises transverse trace segments connected with longitudinal trace segments, and wherein a distance separating adjacent transverse trace segments is defined as pitch; a second radiator, formed as a second meandered trace having a second resonance frequency, wherein the second meandered trace comprises transverse trace segments connected with longitudinal trace segments; wherein the first meandered trace and the second meandered trace join the feeding path at a common joint connecting point; and wherein a distance between a first transverse trace segment of the first meandered trace and a first transverse trace segment of the second meandered trace is less than three times the pitch. In some embodiments, a distance separating adjacent transverse trace segments of the second meandered trace is equal to the pitch. In some embodiments, each of the transverse trace segments in the first meandered trace, except a first transverse trace segment and a last transverse trace segment, have a first length, wherein each of the transverse trace segments in the second meandered trace, except the first transverse trace segment and a last transverse trace segment, have the first length. In some embodiments, the first meandered trace is disposed on a first layer of the printed circuit board and the second meandered trace is disposed on the first layer. In some embodiments, alternating transverse trace segments of the first meandered trace are disposed on a first layer of the printed circuit board and a remainder of the transverse trace segments of the first meandered trace are disposed on a second layer, different from the first layer; and wherein alternating transverse trace segments of the second meandered trace are disposed on the first layer of the printed circuit board and a remainder of the transverse trace segments of the second meandered trace are disposed on the second layer. In certain embodiments, the longitudinal trace segments comprise vias connecting the first layer and the second layer. In certain embodiments, the first transverse trace segment of the first meandered trace is disposed on the first layer and the first transverse trace segment of the second meandered trace is disposed on the second layer. In some embodiments, the wideband antenna comprises a short circuit stub connecting the feeding path to a ground plane. In some embodiments, the wideband antenna comprises a shunt capacitor disposed between the feeding path and a ground plane. In certain embodiments, the first radiator has a resonance frequency between 850 MHz and 875 MHz and the second radiator has a resonance frequency between 900 MHz and 930 MHZ. In certain embodiments, the first radiator has a resonance frequency between 2400 MHz and 2425 MHz and the second radiator has a resonance frequency between 2460 MHz and 2485 MHz. In some embodiments, the distance between the first transverse trace segment of the first meandered trace and the first transverse trace segment of the second meandered trace is three times the pitch or less.

According to another embodiment, a wideband antenna is disclosed. The wideband antenna comprises a printed circuit board, comprising: a feeding path; a first radiator, formed as a first meandered trace having a first resonance frequency; a second radiator, formed as a second meandered trace having a second resonance frequency; wherein the first meandered trace and the second meandered trace join the feeding path at a common joint connecting point; and wherein a total length of the first meandered trace is longer than a total length of the second meandered trace, and a difference between the total length of the first meandered trace and the second meandered trace, divided by the total length of the first meandered trace is less than 14. In some embodiments, the wideband antenna comprises a short circuit stub connecting the feeding path to a ground plane. In some embodiments, the wideband antenna comprises a shunt capacitor disposed between the feeding path and a ground plane. In some embodiments, the first meandered trace is disposed on a first layer of the printed circuit board and the second meandered trace is disposed on the first layer. In some embodiments, the first meandered trace comprises transverse trace segments connected with longitudinal trace segments and the second meandered trace comprises transverse trace segments connected with longitudinal trace segments; and alternating transverse trace segments of the first meandered trace are disposed on a first layer of the printed circuit board and a remainder of the transverse trace segments of the first meandered trace are disposed on a second layer, different from the first layer; and wherein alternating transverse trace segments of the second meandered trace are disposed on the first layer of the printed circuit board and a remainder of the transverse trace segments of the second meandered trace are disposed on the second layer. In certain embodiments, a first transverse trace segment of the first meandered trace is disposed on the first layer and a first transverse trace segment of the second meandered trace is disposed on the second layer. In certain embodiments, the first radiator has a resonance frequency between 850 MHz and 875 MHz and the second radiator has a resonance frequency between 900 MHz and 930 MHz. In certain embodiments, the first radiator has a resonance frequency between 2400 MHz and 2425 MHz and the second radiator has a resonance frequency between 2460 MHz and 2485 MHz.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
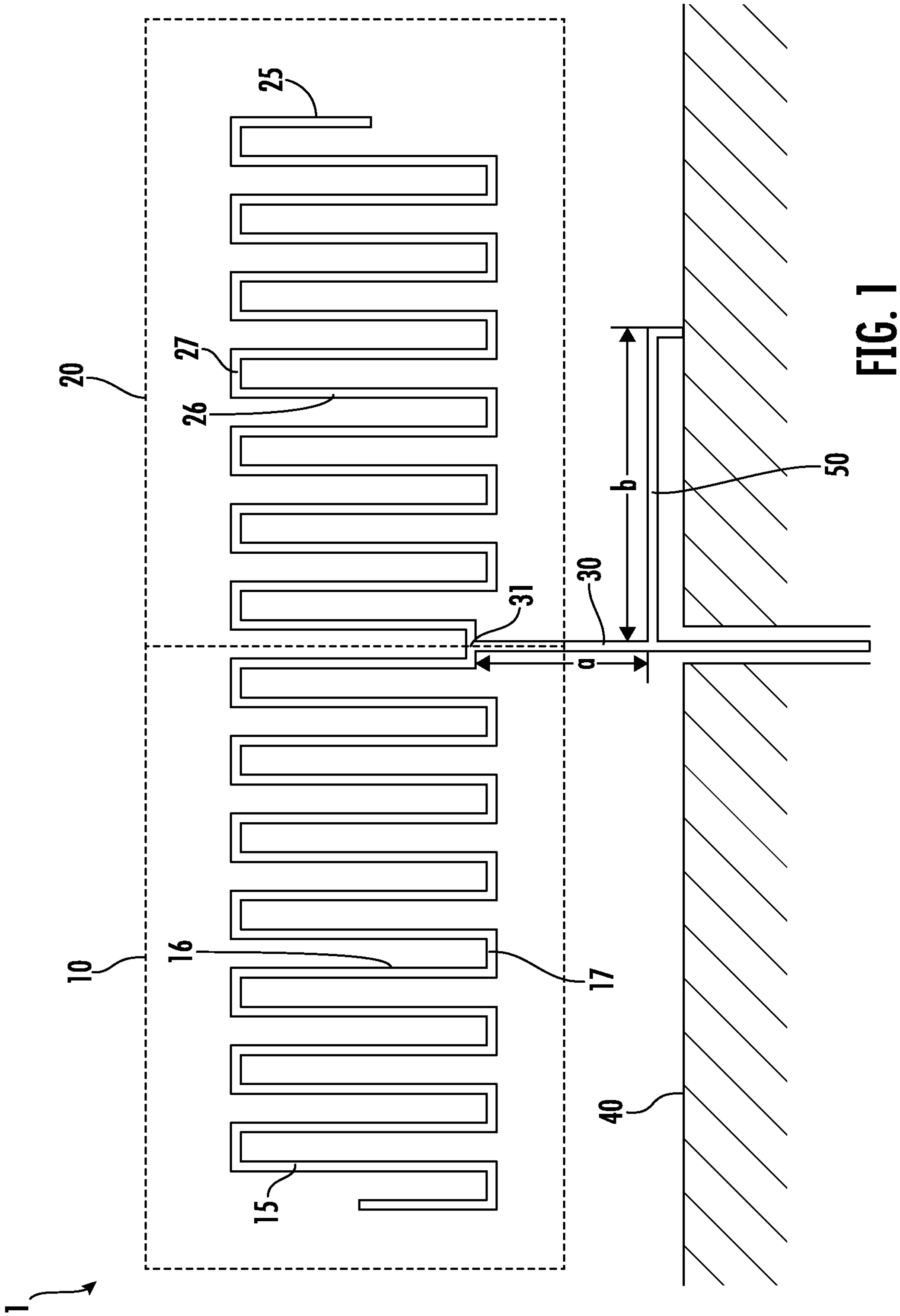
FIG. 1 shows the topology of the antenna according to one embodiment.

FIG. 1 shows the topology of an antenna that overcomes the issues of the prior art. The antenna comprises two high Q radiators that join a common feeding path. In some embodiments, the Q of the two radiators may be between 25 and 50. These radiators resonate at different frequencies to realize a wideband antenna. To reduce antenna area, the two radiators are designed as meandered trace lines.

The antenna is disposed on a printed circuit board (PCB) 1, and the radiators are formed as traces on one or more layers of the PCB 1. The first radiator 10 comprises a first meandered trace 15, which electrically connects to the feeding path 30 at a joint connecting point 31. Similarly, the second radiator 20 comprises a second meandered trace 25, which is also electrically connected to the feeding path 30 at the same joint connecting point 31 as the first meandered trace 15. The feeding path 30 may be disposed on the same layer as the ground plane 40.

In this disclosure, the term "meandered" refers to a trace that does not travel in a continuous straight line. In some embodiments, the meandered trace repeats a pattern of travelling in a first direction, and then travelling in a second direction, different from the first direction. In some embodiments, the first and second direction are perpendicular to one another. In some embodiments, a meandered trace may be a plurality of first trace segments that are parallel to each other and connected at their ends by second trace segments, where the second trace segments are parallel to one another and perpendicular to the first trace segments. The first trace segments may be referred to as transverse trace segments and the second trace segments may be referred to as longitudinal trace segments. The transverse trace segments may be longer than the longitudinal trace segments. The lengths of the transverse trace segments and the longitudinal trace segments are not limited by this disclosure and may be determined based on the design criteria. For example, a printed circuit board which is narrow may utilize longer transverse trace segments, to minimize the number of transverse trace segments. Conversely, a wider PCB may utilize shorter transverse traces to minimize the length of the radiators.

Thus, in certain embodiments, the first meandered trace 15 is made up of a plurality of longer transverse trace segments 16 that are parallel to one another and connected using shorter longitudinal trace segments 17, which are perpendicular to the transverse trace segments 16. Similarly, the second meandered trace 25 is made up of longer transverse trace segments 26 that are connected using shorter longitudinal trace segments 27. In this disclosure, the term "pitch" is used to define the distance, in the longitudinal direction, between two adjacent transverse trace segments in one of the meandered traces. In certain embodiments, the pitch of the first meandered trace 15 is the same as the pitch of the second meandered trace 25. In certain embodiments, the pitch may be related to the width of the meandered traces. For example, the trace width (w) of the meandered traces may be between 0.1 mm and 1 mm and the pitch (p) may be between 1.5 and 6 times the trace width. In other words, $1.5\ w \le p \le 6\ w$.

Figure 2:
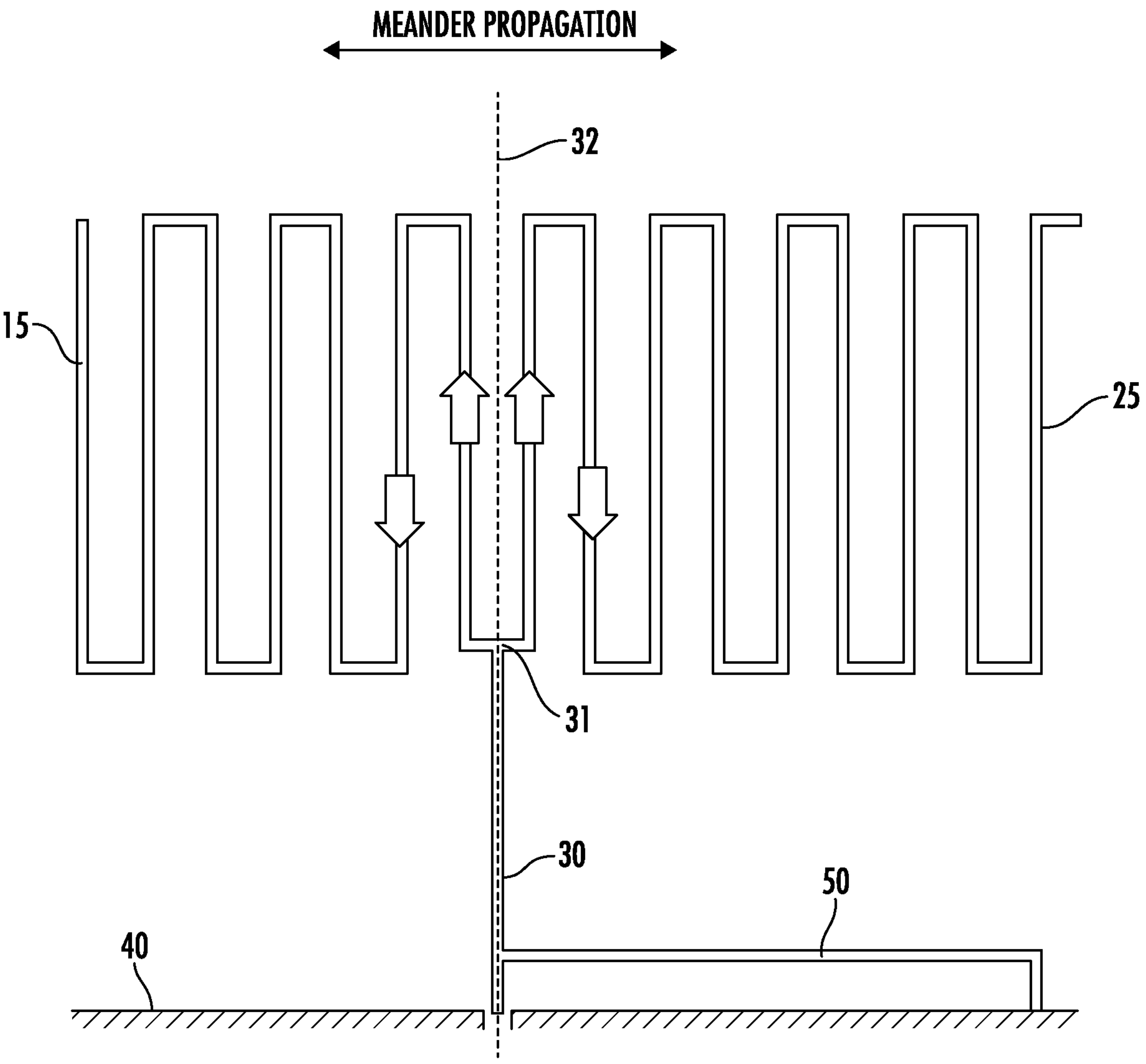
FIG. 2 shows the direction of current flow of the antenna in FIG. 1.

Further, as best shown in FIG. 2, the meandered traces 15, 25 are connected to the feeding path 30 such that the current in the transverse trace segments of the two meandered traces that are closest to one another is flowing in the same direction. These two trace segments may be very close to one another. For example, in one embodiment, the distance between these two transverse trace segments is equal to the pitch of the meandered traces. In other words, the spacing between these two transverse trace segments is the same as the spacing between transverse trace segments in the first meandered trace 15 or the second meandered trace 25. In certain embodiments, the distance between these two transverse trace segments from different meandered traces is less than 3 times the pitch. In certain embodiments, the distance between these two transverse trace segments from different meandered traces is less than twice the pitch. In other embodiments, the distance between these two transverse trace segments from different meandered traces may be equal to the pitch. In this disclosure, the transverse trace segment in the meandered trace that is closest to the line of symmetry 32 is referred to as the first transverse trace segment. Continuing, the next closest transverse trace segments is referred to as the second transverse segment. This continues for all of the transverse trace segments.

Thus, the feeding path 30 creates a line of symmetry 32 and the meandered traces 15, 25 are arranged such that symmetric transverse currents are created about this line of symmetry 32. Further, as seen in FIG. 2, the current flows away from the line of symmetry 32 in opposite directions. In other words, current through each meandered trace 15, 25 propagates in opposite directions, where the propagation direction is perpendicular to the line of symmetry 32. Additionally, the current flows in the same direction through the first transverse trace segment in each radiator that is closest to the line of symmetry 32.

Additionally, the transverse trace segments 16 of the first meandered trace 15 are parallel to the transverse trace segments 26 of the second meandered trace 25. In some embodiments, the transverse trace segments 16 of the first meandered trace 15 (except the first and last segment) are all equal in length. Similarly, in some embodiments, the transverse trace segments 26 of the second meandered trace 25 (except the first and last segment) are all equal in length. Additionally, in some embodiments, the lengths of the transverse trace segments 16 in the first meandered trace 15 are equal to the lengths of the transverse trace segments 26 in the second meandered trace 25 (excluding the first and last segment). Thus, in some embodiments, the two radiators are identical except for the number of transverse trace segments and the length of the last transverse segment. In other words, the lengths of the transverse trace segments are equal in both radiators. Similarly, the pitch is the same for both radiators.

In the embodiment shown in FIG. 1, the meandered traces 15, are each disposed on the same layer of the PCB 1. Note that the length of each meandered trace 15, 25 determines the resonance frequency of that radiator. Therefore, to create a wideband antenna, the first meandered trace 15 and the second meandered trace 25 have different, but similar, lengths. In certain embodiments, when acting as a wideband antenna, the difference in length between the first meandered trace 15 and the second meandered trace 25, divided by the longer of the two traces is less than ¼. However, note that larger differences are also possible. However, in those embodiments, the antenna may operate as a dual band antenna, rather than a wideband antenna. When the two meandered traces have similar total lengths, the RF currents in their respective transverse trace segments (which are perpendicular to the meander propagation direction) have a small phase difference at the resonance frequencies. This small phase difference results an advantageous proximity effect, also referred to as constructive interference, between the two sets of transverse trace segments and ultimately allows smaller clearance between the two meandered traces.

Further, in some embodiments, the impedance of the antenna may be adjusted through the use of a short circuit stub 50. The short circuit stub 50 is a trace that is electrically connected to the feeding path 30 and the ground plane 40. The short circuit stub 50 has a length “b”. Furthermore, the short circuit stub 50 connects to the feeding path 30 at a distance “a” from the joint connecting point 31. The impedance of the antenna may be tuned by adjusting at least one of length “b” and distance “a”. In this way, the antenna impedance may be matched to a constant impedance load/source across the entire operating frequency range.

Figure 3:
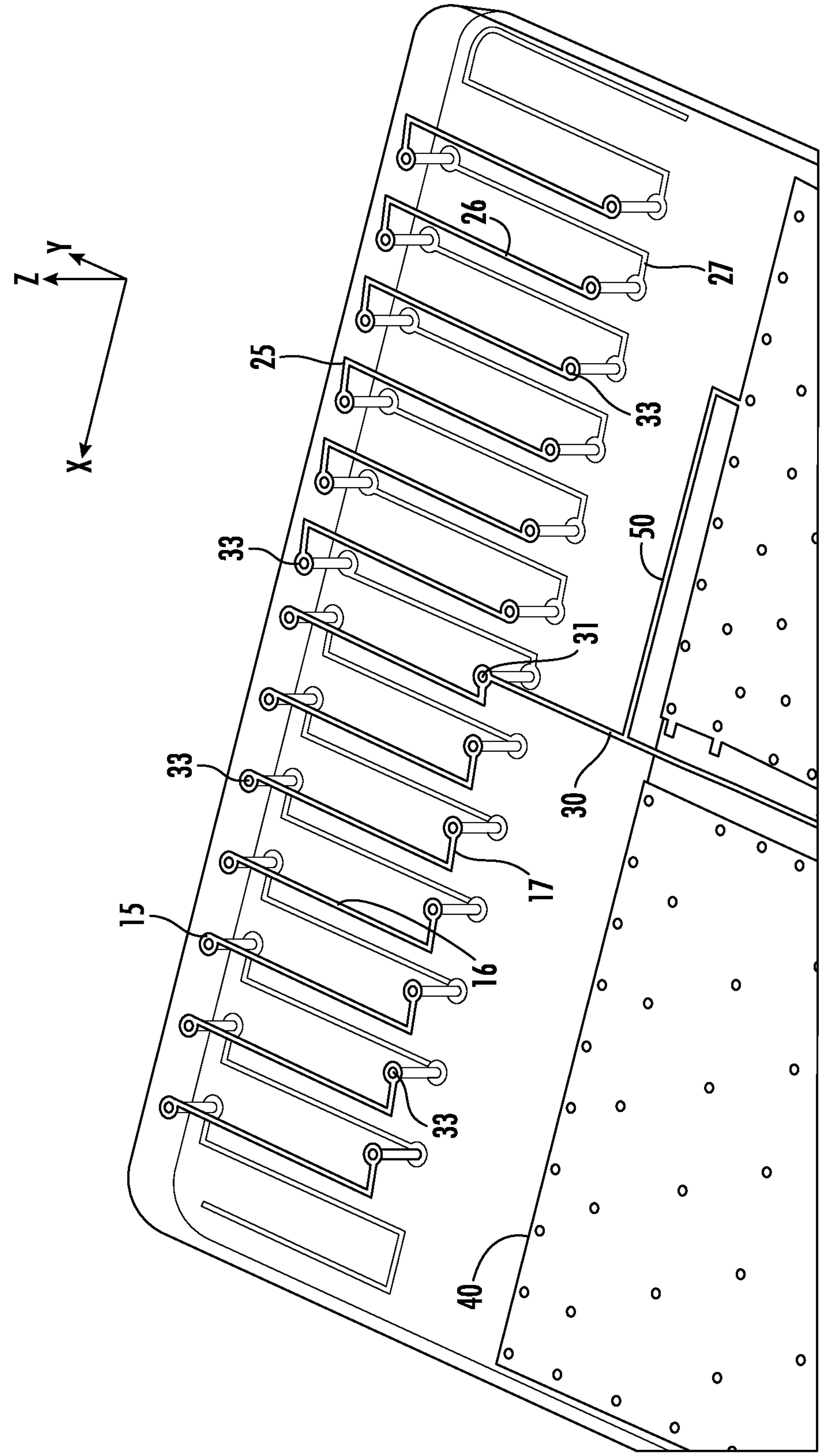
FIG. 3 shows the topology of the antenna according to a second embodiment.

While FIG. 1 shows the meandered traces 15, 25 disposed on a single layer of the PCB 1, other embodiments are also possible. FIG. 3 shows an embodiment where the meandered traces are disposed on two different layers of the PCB 1. Like components have been given identical reference designators in this figure.

In FIG. 3, the meandered traces 15, 25 are disposed on two layers. In one embodiment, vias 33 are located at the ends of the transverse trace segments 16, 26. The vias 33 are used to connect to the trace segment on the other layer. Further, in some embodiments, the transverse trace segments 16 are disposed on alternating layers, such that the first, third, and other odd numbered transverse trace segments are disposed on a first layer of the PCB 1 and the second, fourth and other even numbered transverse trace segments are disposed on a second layer of the PCB 1.

To increase isolation between the two meandered traces 15, 25, in certain embodiments, the two meandered segments are arranged differently on the two layers. For example, in FIG. 3, the first meandered trace 15 has the odd numbered transverse trace segments 16 disposed on the top layer and the even numbered transverse trace segments 16 on the lower layer. The second meandered trace 25 has the odd numbered transverse trace segments disposed on the lower layer and the even numbered transverse trace segments on the top layer. In this way, the transverse trace segments from the two meandered traces 15, 25 that are closest to one another are separated in both the width (X) and height (Z) directions. In yet another embodiment, to save space, the transverse trace segments from the two meandered traces 15, 25 that are closest to one another may be aligned in the height direction such that one of the trace segments is directly above the other trace segment. Thus, in the embodiment shown in FIG. 3, the distance between the closest transverse trace segments in the two radiators (in the longitudinal direction) may be less than the pitch of the meandered traces 15, 25. Alternatively, the distance between the closest transverse trace segments in the two radiators (in the longitudinal direction) may be as described above with respect to the single layer configuration.

Note that the current flow in this embodiment is as shown in FIG. 2 and described above. Further, note that the longitudinal trace segments may be configured in a symmetric manner, where the longitudinal trace segments in the first meandered trace 15 that are nearest the ground plane 40 are disposed on the top layer, while the longitudinal trace segments in the first meandered trace that are furthest from the ground plane 40 are disposed on the lower layer of the PCB 1. Note that the second meandered trace 25 is configured in the opposite manner, such that longitudinal trace segments in the second meandered trace 25 that are nearest the ground plane 40 are disposed on the lower layer, while the longitudinal trace segments in the second meandered trace 25 that are furthest from the ground plane 40 are disposed on the top layer of the PCB 1.

Figure 7:
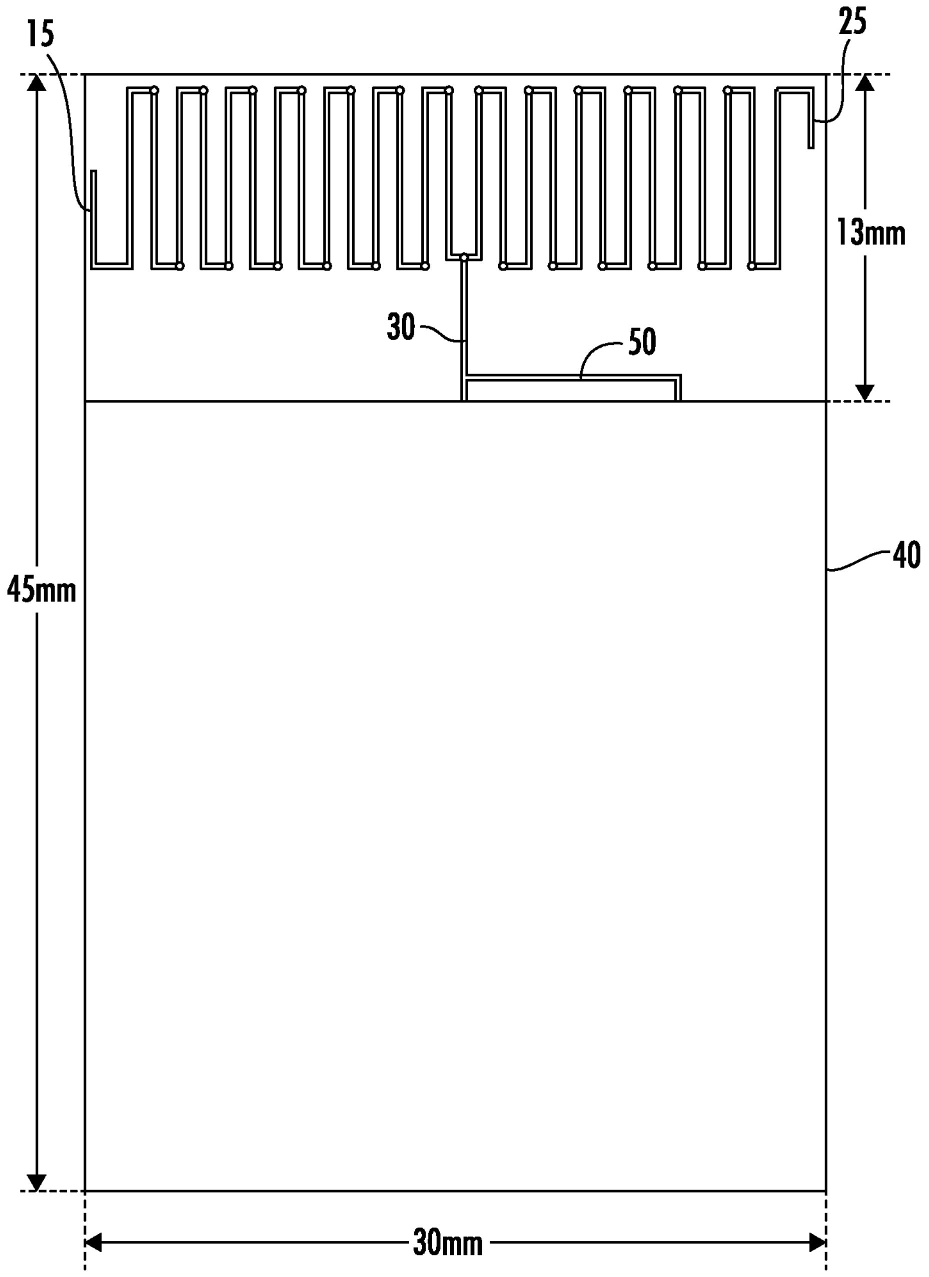
FIG. 7 shows a module containing the antenna of FIG. 3.

This configuration allows a compact design. In one embodiment, the antenna was disposed on a PCB and occupied a region having dimensions 13 mm×30 mm, as shown in FIG. 7. The ground plane on this PCB had dimensions 32 mm×30 mm.

Figure 4A:
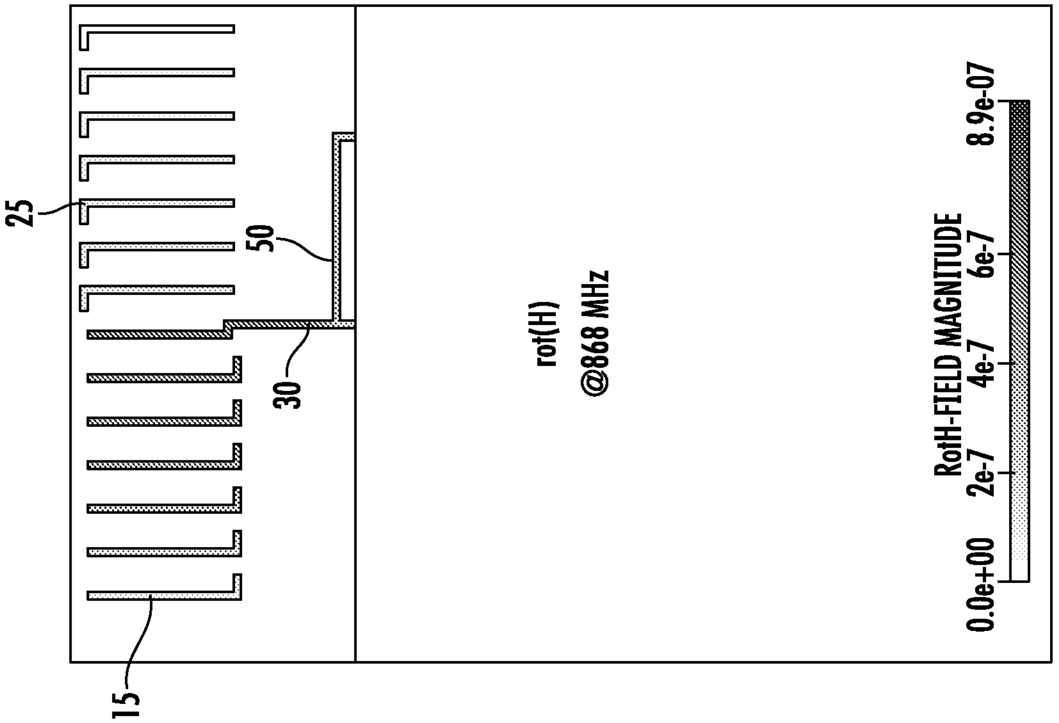
FIG. 4A shows the currents generated at a first resonance frequency for the antenna of FIG. 3.
Figure 4B:
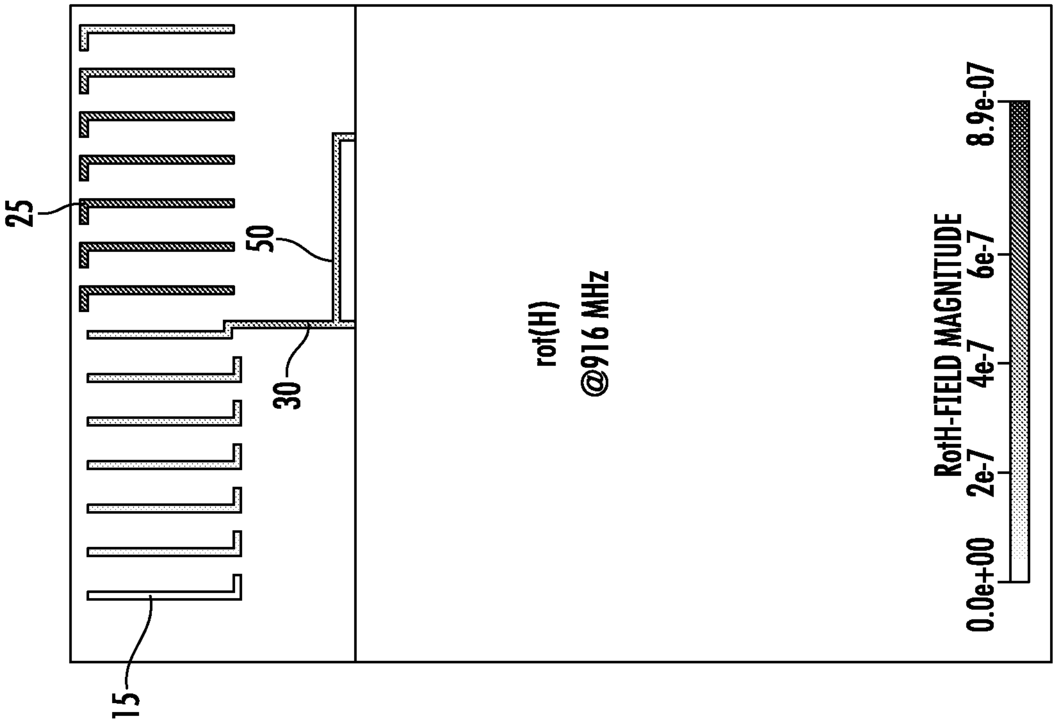
FIG. 4B shows the currents generated at a second resonance frequency for the antenna of FIG. 3.

FIGS. 4A-4B show the operation of the antenna of FIG. 3. Note that only the top layer of the PCB 1 is shown. The first meandered trace 15 was dimensioned so as to have a first resonance frequency of 868 MHz, although it may be between 850 MHz and 875 MHz. The second meandered trace 25 was dimensioned so as to have a second resonance frequency of 916 MHz, although it may be between 900 MHZ and 930 MHz. FIG. 4A shows the current flow through the antenna when energized with a signal having the first resonance frequency. Note that almost all of the current flows through the feeding path and first meandered trace 15. FIG. 4B shows the current flow through the antenna when energized with a signal having the second resonance frequency. Note that almost all of the current flows through the feeding path 30 and second meandered trace 25.

Figure 5:
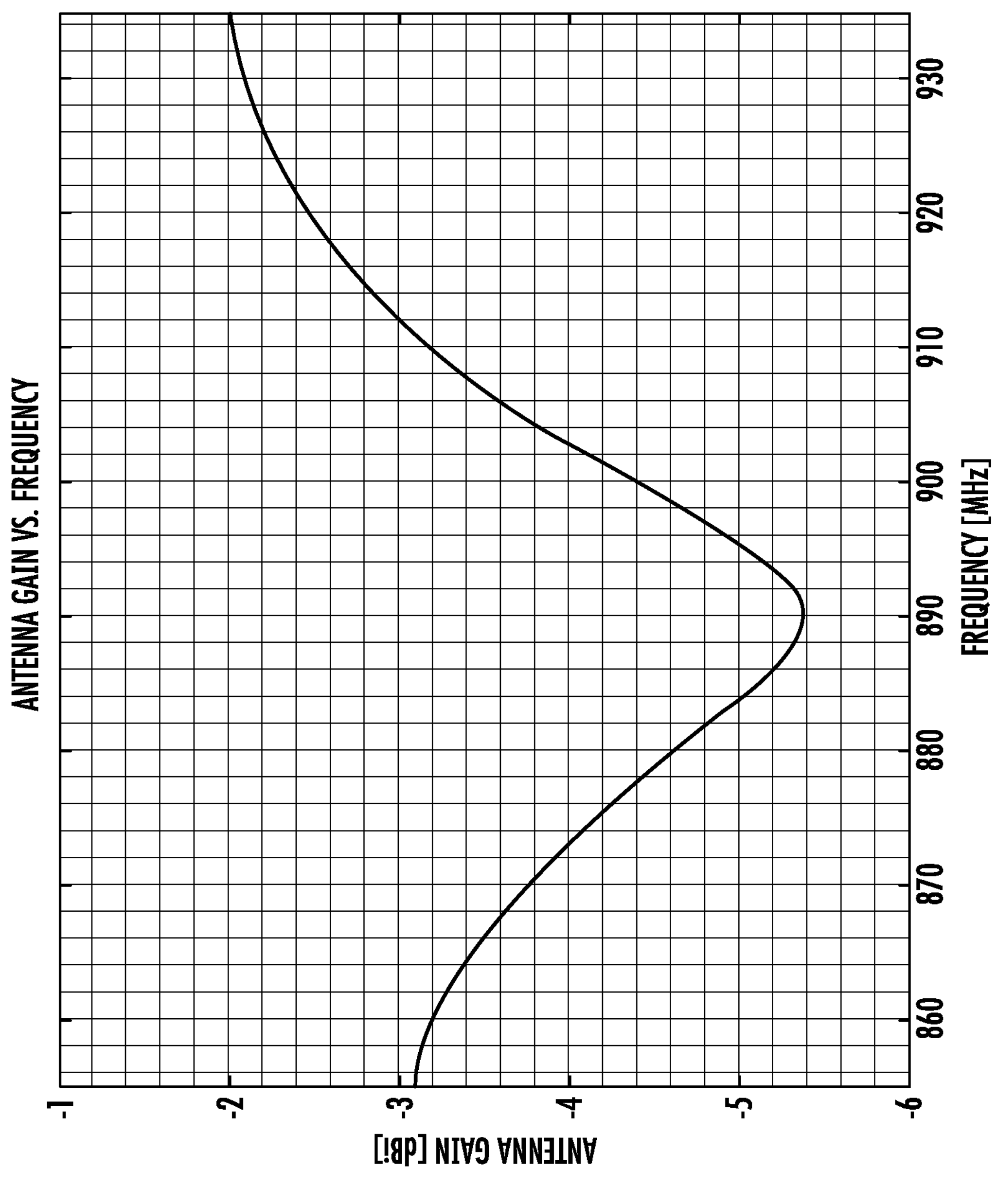
FIG. 5 shows the gain of the antenna over a broad range of frequencies for the antenna of FIG. 3.
Figure 6:
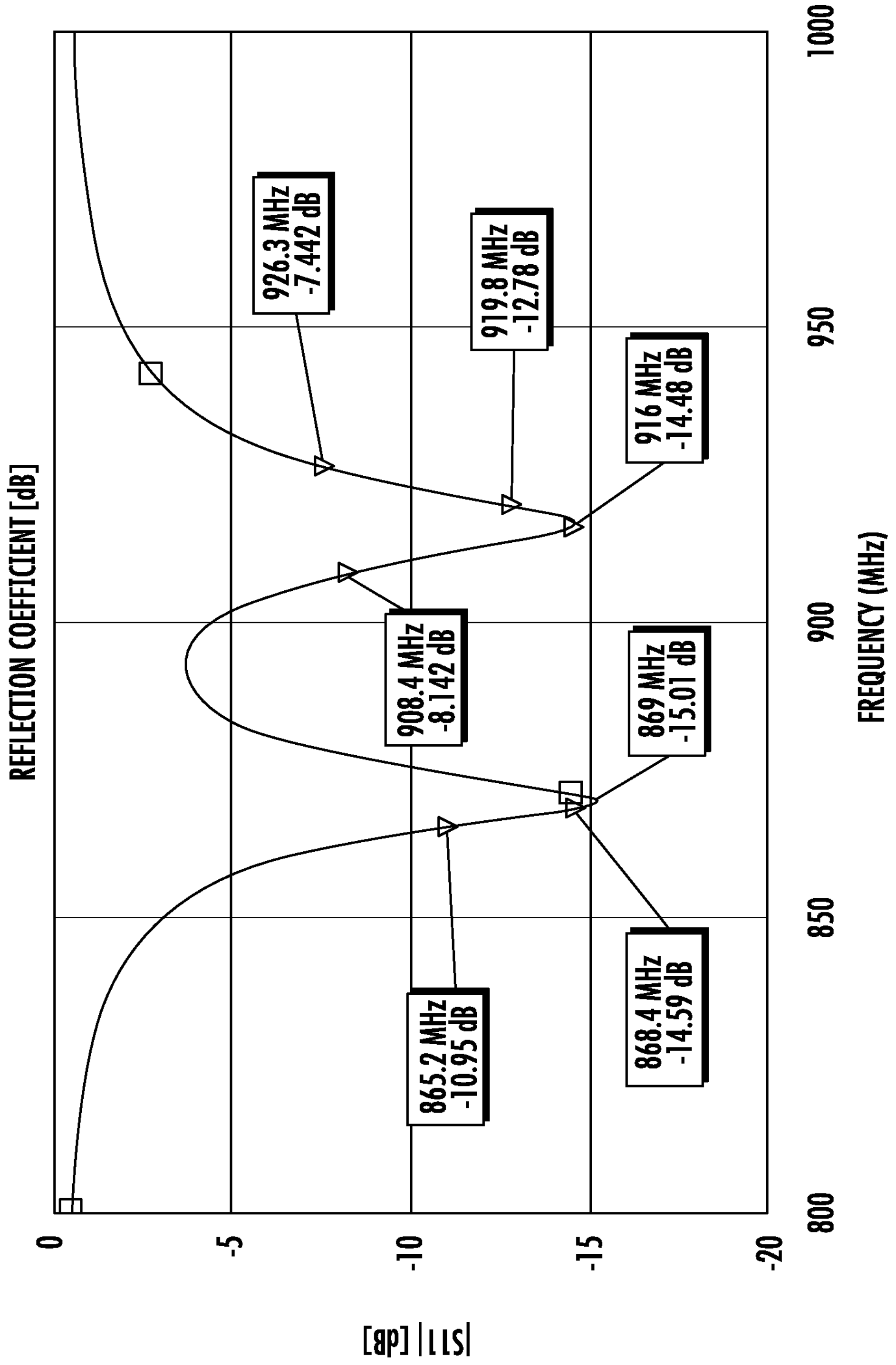
FIG. 6 shows the reflection coefficient over a broad range of frequencies for the antenna of FIG. 3.

Simulations for the antenna shown in FIG. 3 are shown in FIGS. 5-7. Again, the first meandered trace 15 was dimensioned so as to have a first resonance frequency of 868 MHz, while the second meandered trace 25 was dimensioned so as to have a second resonance frequency of 916 MHz. FIG. 5 shows the gain of the antenna over a wide frequency range that includes these two resonance frequencies. Note that the antenna has a gain of greater than about −5.5 dBi over a range of about 80 MHz. Further, the range of frequencies with the poorest gain (875 MHz to 900 MHZ) is not deemed to be important, as there are no ISM bands in this range. In fact, if that range is excluded, the gain is at least −4 dBi over the range from 850 MHz to 935 MHz.

FIG. 6 shows the reflection coefficient over the same range of frequencies. Note that the coefficient is smallest near the two resonance frequencies. Further, the reflection coefficient is less than −6 dB throughout a frequency range from 859 MHz to 929 MHZ, except between 881 MHz and 904 MHZ.

Figure 8:
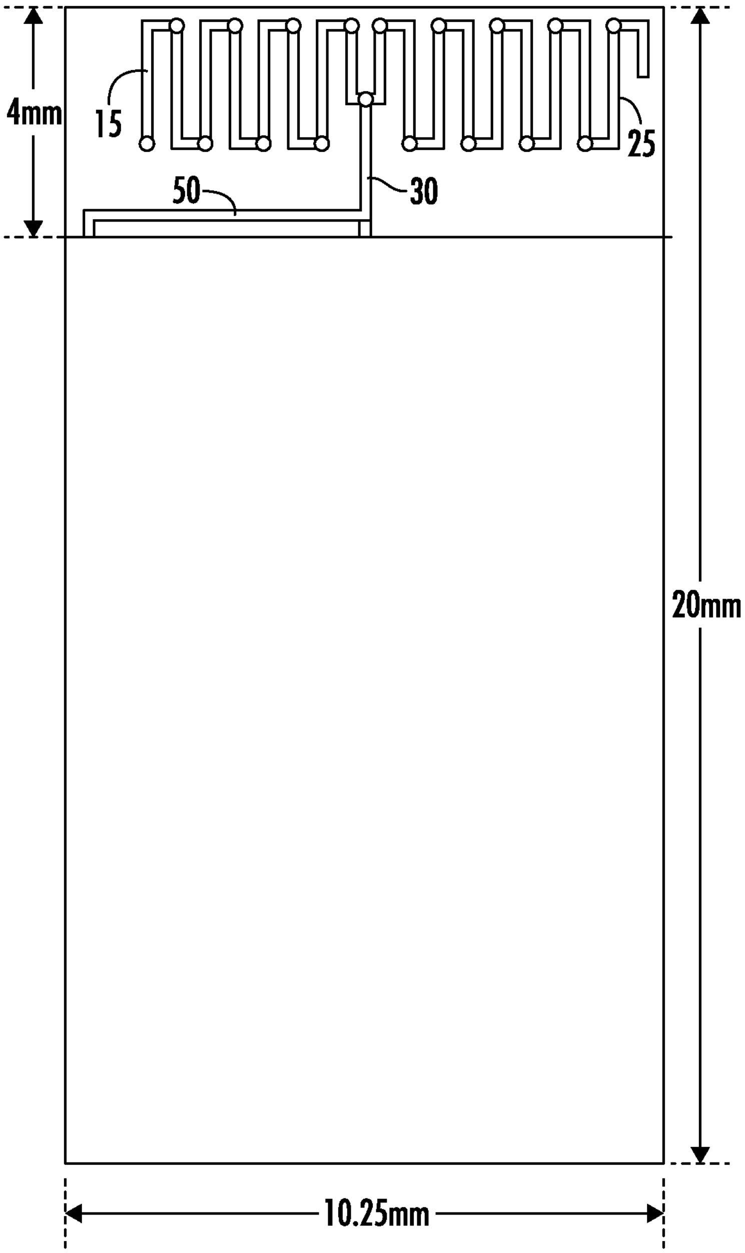
FIG. 8 shows a module containing an antenna according to another embodiment.

Note that while this simulation was performed using the first and second resonance frequencies described above, the first meandered trace 15 and the second meandered trace 25 may be dimensioned differently to cover a different frequency range. For example, the wideband antenna may be designed to have an operating range in the 2.4 GHz range. The first resonance frequency may be between 2400 MHz and 2425 MHz, such as about 2415 MHz. This allows operation in the range from 2380 MHz to 2450 MHZ. The second resonance frequency may be between 2460 MHz and 2485 MHz, such as about 2475 MHz. This allows operation in the range from 2440 MHZ to 2510 MHz. FIG. 8 shows this configuration where the antenna was disposed on a PCB and occupied a region having dimensions 4 mm×10.25 mm. The ground plane on this PCB had dimensions 16 mm×10.25 mm.

The antenna was fabricated using two layers of the PCB, as described with respect to FIG. 3. As described above, the distance in the longitudinal direction between the first transverse trace segment of the first meandered trace 15 and the first transverse trace segment of the second meandered trace 25 is 3 times the pitch or less.

Figure 9:
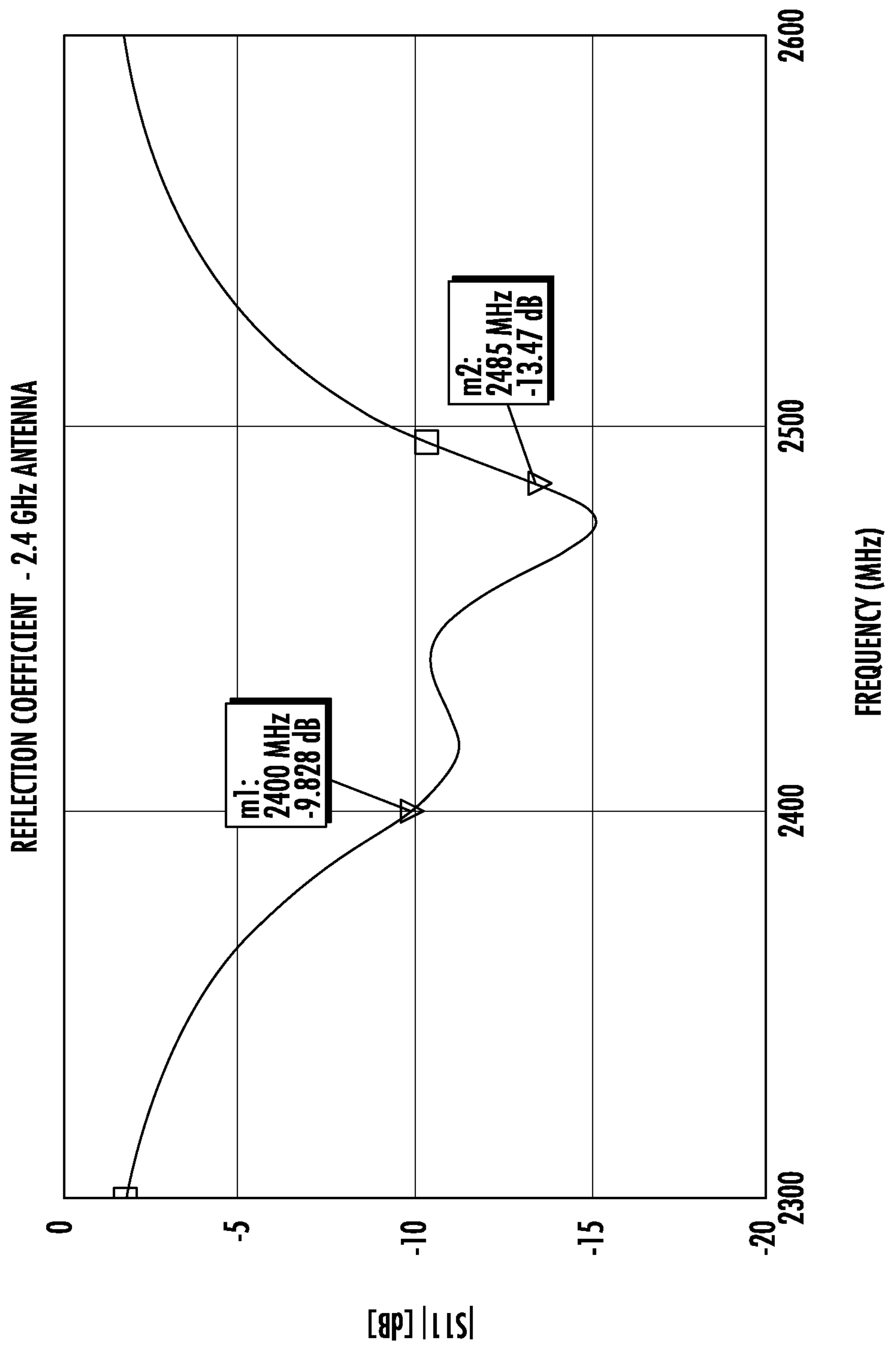
FIG. 9 shows the reflection coefficient over a broad range of frequencies for the antenna of FIG. 8.

Note that, as shown in FIG. 9, this antenna has a reflection coefficient that is less than −10 dB over a range of almost 100 MHz; from roughly 2400 MHz to roughly 2500 MHZ.

Figure 10:
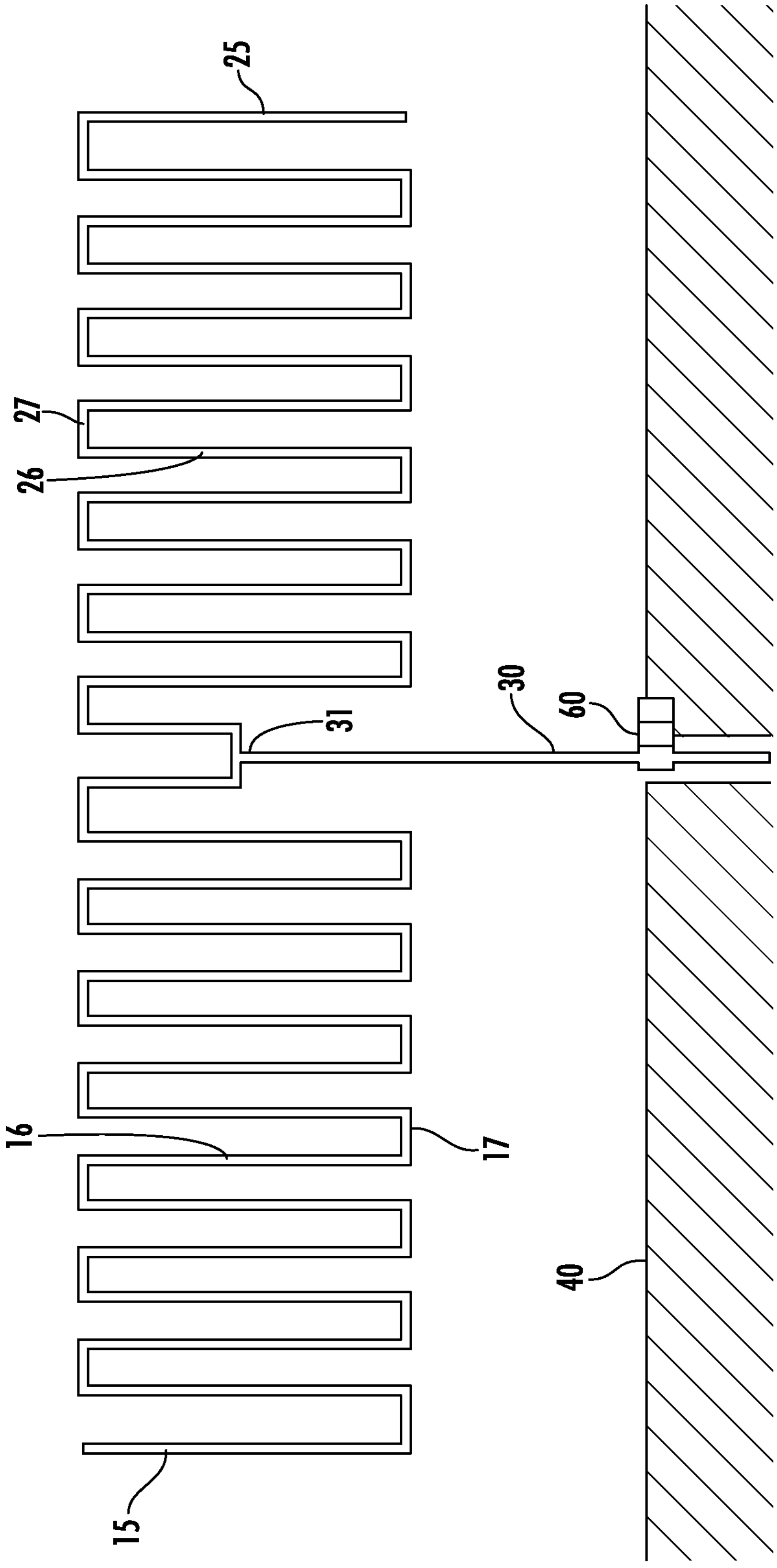
FIG. 10 shows an alternate embodiment that may be used to match impedance.

While FIGS. 1-3, 4A-4B, 7 and 8 show a short circuit stub 50, other embodiments are also possible. For example, FIG. 10 shows a configuration with a shunt capacitor 60. The shunt capacitor 60 has one lead in contact with the feeding path 30 and the second lead in contact with the ground plane 40. In this embodiment, the antenna is matched to the desired impedance (such as 50Ω) by the feeding path 30 and the shunt capacitor 60. The length of the feeding path 30 (i.e., from the joint connecting point 31 to the shunt capacitor 60) may be adjusted so that the antenna conductance at the shunt capacitor 60 is about 20 mS, while the susceptance (which is the imaginary part of the admittance) is negative. In this way, the antenna may then have 20 mS conductance and −B mS susceptance. The value (C) of the shunt capacitor 60 that matches the antenna impedance to 50Ω can then be calculated as $C=B/(2\pi f)$, where f is the frequency range of interest.

Note that the shunt capacitor 60 may be used in place of the short circuit stub 50 in any of the embodiments described above.

This system and method have many advantages. By incorporating two meandered traces having slightly different lengths, a wideband antenna may be created. In one instance, this antenna may be used at one resonance frequency for Europe, and may utilize a different resonance frequency in the U.S. and Japan, due to regulatory differences. By creating a wideband antenna, the same design may be used for both locales without modification. The resonators are designed using different resonance frequencies that are relatively close to one another. Further, the bandwidth of each resonator is such that they overlap to enable wideband operation.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A wideband antenna, comprising:

a printed circuit board, comprising:

a ground layer having an edge parallel to an edge of the printed circuit board and disposed on a top surface of the printed circuit board;

a feeding path;

a first radiator, formed as a first meandered trace having a first resonance frequency, wherein the first meandered trace comprises a plurality of transverse trace segments connected with a plurality of longitudinal trace segments, and wherein a distance separating adjacent transverse trace segments is defined as pitch and wherein alternating longitudinal trace segments are collinear and all of the longitudinal trace segments are parallel to the edge of the ground layer;

a second radiator, formed as a second meandered trace having a second resonance frequency different from the first resonance frequency, wherein the second meandered trace comprises a plurality of transverse trace segments connected with a plurality of longitudinal trace segments and is a different length than the first meandered trace and wherein alternating longitudinal trace segments are collinear and all of the longitudinal trace segments are parallel to the edge of the ground layer;

wherein the first meandered trace and the second meandered trace join the feeding path at a common joint connecting point and extend in opposite directions from the common joint connecting point; and wherein a distance between a first transverse trace segment of the first meandered trace and a first transverse trace segment of the second meandered trace is three times the pitch or less.

2. The wideband antenna of claim 1, wherein a distance separating adjacent transverse trace segments of the second meandered trace is equal to the pitch.

3. The wideband antenna of claim 1, wherein each of the transverse trace segments in the first meandered trace, except a first transverse trace segment and a last transverse trace segment, have a first length, wherein each of the transverse trace segments in the second meandered trace, except the first transverse trace segment and a last transverse trace segment, have the first length.

4. The wideband antenna of claim 1, wherein the first meandered trace is disposed on a first layer of the printed circuit board and the second meandered trace is disposed on the first layer.

5. The wideband antenna of claim 1, wherein alternating transverse trace segments of the first meandered trace are disposed on a first layer of the printed circuit board and a remainder of the transverse trace segments of the first meandered trace are disposed on a second layer, different from the first layer; and wherein alternating transverse trace segments of the second meandered trace are disposed on the first layer of the printed circuit board and a remainder of the transverse trace segments of the second meandered trace are disposed on the second layer.

6. The wideband antenna of claim 5, wherein the longitudinal trace segments comprise vias connecting the first layer and the second layer.

7. The wideband antenna of claim 5, wherein the first transverse trace segment of the first meandered trace is disposed on the first layer and the first transverse trace segment of the second meandered trace is disposed on the second layer.

8. The wideband antenna of claim 1, further comprising a short circuit stub connecting the feeding path to a ground plane.

9. The wideband antenna of claim 1, further comprising a shunt capacitor disposed between the feeding path and a ground plane.

10. The wideband antenna of claim 1, wherein the first radiator has a resonance frequency between 850 MHz and 875 MHz and the second radiator has a resonance frequency between 900 MHz and 930 MHz.

11. The wideband antenna of claim 1, wherein the first radiator has a resonance frequency between 2400 MHz and 2425 MHz and the second radiator has a resonance frequency between 2460 MHz and 2485 MHz.

12. The wideband antenna of claim 1, wherein a total length of the first meandered trace is longer than a total length of the second meandered trace, and a difference between the total length of the first meandered trace and the second meandered trace, divided by the total length of the first meandered trace is less than ¼.

13. The wideband antenna of claim 1, wherein the feeding path creates a line of symmetry such that symmetric transverse currents are created through the first meandered trace and the second meandered trace about the line of symmetry.

14. The wideband antenna of claim 1, wherein alternating longitudinal trace segments of the first meandered trace and alternating longitudinal trace segments of the second meandered trace are collinear.

* * * * *